United States Patent
Hui et al.

(10) Patent No.: US 9,571,259 B2
(45) Date of Patent: Feb. 14, 2017

(54) METHOD OF DOWNLINK SIGNAL TRANSPORT OVER BACKHAUL COMMUNICATIONS THROUGH DISTRIBUTED PROCESSING

(71) Applicant: TELEFONAKTIEBOLAGET L M ERICSSON (PUBL), Stockholm (SE)

(72) Inventors: Dennis Hui, Sunnyvale, CA (US); Shing-Wa Wong, Saratoga, CA (US); Jung-Fu Cheng, Fremont, CA (US); Jiann-Ching Guey, Hsinchu (TW); Kambiz Zangi, Chapel Hill, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 391 days.

(21) Appl. No.: 14/249,740

(22) Filed: Apr. 10, 2014

(65) Prior Publication Data

US 2014/0204896 A1     Jul. 24, 2014

Related U.S. Application Data

(62) Division of application No. 13/045,830, filed on Mar. 11, 2011, now Pat. No. 8,737,298.

(51) Int. Cl.
*H04L 5/00* (2006.01)
*H04B 7/02* (2006.01)
(Continued)

(52) U.S. Cl.
CPC ............. *H04L 5/0073* (2013.01); *H04B 7/024* (2013.01); *H04L 5/0035* (2013.01);
(Continued)

(58) Field of Classification Search
None
See application file for complete search history.

(56) References Cited

U.S. PATENT DOCUMENTS

| 8,401,095 B2 | 3/2013 | Han et al. |
| 2003/0088822 A1* | 5/2003 | Kim ................. H03M 13/2957 714/790 |

(Continued)

FOREIGN PATENT DOCUMENTS

| CN | 101741439 A | 6/2010 |
| JP | 1998-207645 A | 8/1998 |

(Continued)

OTHER PUBLICATIONS

Texas Instruments: "Aspects of Coordinated Multi-point Transmission for Advanced E-UTRA" 3GPP Draft; RI-084444, 3rd Generation Partnership Project (3GPP), Mobile Competence Centre, 650 Route Des Lucioles; F-06921 Sophia-Antipolis Cedex; France, No. Prague t Czech Republic; Nov. 5, 2008, Nov. 5, 2008 (Nov. 5, 2008), p. 1, paragraph 1-p. 3, last paragraph, tables A-1, Figure 1.

(Continued)

*Primary Examiner* — Anh Ngoc Nguyen (57) ABSTRACT

The amount of multi-antenna signals to be transmitted over the backhaul in a Coordinated MultiPoint (CoMP) system from the central processor (CP) to each base station is reduced. Embodiments of the present invention exploit characteristics of the underlying signal structure, and distribute some baseband processing functionalities—such as channel coding and the application of the multi-user precoding—from the CP to the remote base stations. Additionally, in some embodiments the non-precoded parts of multi-antenna signals are broadcast from the CP to all base stations in the CoMP system, to further reduce the burden on backhaul communications. In one embodiment, the backhaul network is a Gigabit-capable Passive Optical Network (GPON).

10 Claims, 6 Drawing Sheets

(51) Int. Cl.
  *H04B 7/04* (2006.01)
  *H04W 92/12* (2009.01)
  *H04W 92/20* (2009.01)

(52) U.S. Cl.
  CPC .......... *H04B 7/0452* (2013.01); *H04W 92/12* (2013.01); *H04W 92/20* (2013.01)

(56) References Cited

U.S. PATENT DOCUMENTS

| | | | |
|---|---|---|---|
| 2003/0112880 A1* | 6/2003 | Walton | H04B 7/0417 375/260 |
| 2007/0280386 A1* | 12/2007 | Waes | H04L 1/0637 375/347 |
| 2010/0027456 A1 | 2/2010 | Onggosanusi et al. | |
| 2010/0239036 A1 | 9/2010 | Koo et al. | |
| 2010/0290382 A1 | 11/2010 | Hui et al. | |

FOREIGN PATENT DOCUMENTS

| | | |
|---|---|---|
| JP | 2010-539763 T | 12/2010 |
| JP | 2011-508576 T | 3/2011 |
| WO | WO 2009/040138 A2 | 4/2009 |
| WO | WO 2009/084904 A2 | 7/2009 |

OTHER PUBLICATIONS

Joham M. et al: "Linear transmit processing in MIMO communications systems", IEEE Transactions on Signal Processing, vol. 53, No. 8, Aug. 1, 2005 (Aug. 1, 2005), pp. 2704-2707.

Haard T. et al: Zero-Forcing Methods for Downlink Spatial Multiplexing in Multiuser MIMO Channel IEEE Service Center, New York, NY, US, vol. 52, No. 2, Feb. 1, 2004 (Feb. 1, 2004), pp. 461-468.

* cited by examiner

METHOD OF DOWNLINK SIGNAL TRANSPORT OVER BACKHAUL COMMUNICATIONS THROUGH DISTRIBUTED PROCESSING

CROSS-REFERENCE TO RELATED APPLICATIONS

This application is a divisional of co-pending U.S. patent application Ser. No. 13/045,803 filed on Mar. 11, 2011, the disclosure of which is fully incorporated herein by reference.

FIELD OF INVENTION

The present invention relates generally to wireless telecommunications, and in particular to a method of transmitting information on backhaul channels in wireless telecommunication networks.

BACKGROUND

The exponential growth in the demand of wireless data communications has put a tremendous pressure on the cellular network operators to improve the capacity of their communication networks. To improve the spectral efficiency of these networks, scarce radio resources have to be reused aggressively in neighboring cells. As a result, inter-cell interference (ICI) has become a main source of signal disturbance, limiting not only the service quality of the cell-edge users, but also the overall system throughput.

Coordinated multi-point (CoMP) transmission or reception is one known means to effectively mitigate inter-cell interference. In CoMP systems, a central processor coordinates downlink transmissions to, and possibly also uplink transmissions from, all users in the cells forming the CoMP system. The central processor transmits to each base station—via a backhaul data communication network—a representation of the RF signal to be transmitted into its cell by each antenna. The central processor coordinates and optimizes transmissions to reduce or even avoid mutual interference among users.

Downlink CoMP transmission systems, in particular, can effectively mitigate ICI using multi-user precoding techniques. Multi-user precoding allows simultaneous transmission over the same frequency band to multiple users without creating any mutual interference (within a CoMP cluster 10) by sending signal to each user in a "direction" orthogonal to the channel and other users. However, the amount of information the central processor is required to send to or receive from each remote base station can be overwhelming, particularly when multiple antennas are deployed at each base station. The antenna signals to be distributed, in general, are complex-valued downlink signals comprising both In-phase (I) and Quadrature (Q) components for each antenna branch. In the standard Common Public Radio Interface (CPRI), each real-valued sample of the IQ backhaul signal would simply be quantized independently by a fixed number of bits (e.g., 16), without considering any structure of the underlying backhaul signal. The sheer quantity of such transmission places a large burden on the capacity of backhaul links—indeed, the capacity of backhaul communication links between the central processor and multiple base stations may limit CoMP system 10 performance.

SUMMARY

According to one or more embodiments disclosed and claimed herein, the amount of multi-antenna signals to be transmitted over the backhaul in a CoMP system from the central processor (CP) to each base station is reduced. Embodiments of the present invention exploit characteristics of the underlying signal structure, and distribute some baseband processing functionalities—such as channel coding and the application of the multi-user precoding—from the CP to the remote base stations. Additionally, in some embodiments the non-precoded parts of multi-antenna signals are broadcast from the CP to all base stations in the CoMP system, to further reduce the burden on backhaul communications.

One embodiment relates to a method of distributing, from a CP in a CoMP system, to a plurality of base stations, information to be transmitted to User Equipment (UE) in cells served by the base stations. A multi-user precoding matrix is selected for each base station, each precoding matrix comprising precoding weights to be applied to symbols to be transmitted to UEs by a base station. Information about a precoding matrix selected for each base station is transmitted to that base station. The information bits to be transmitted to all UEs in the CoMP system are computed. The set of information bits is transmitted to all base stations in the CoMP system.

Another embodiment relates to a method of transmitting signals to UEs in a cell of a CoMP system. Information about a precoding matrix, and the information bits to be transmitted to all UEs in the CoMP system, are received from a CP at a base station. A modulation and coding scheme is applied to the information bit to generate modulated symbols. Precoding weights from the precoding matrix are applied to the modulated symbols to generate precoded symbols. The precoded symbols are transmitted to UEs in the cell.

Yet another embodiment relates to a CP in a CoMP system. The CP includes a backhaul network interface operative to communicatively couple the CP to a plurality of base stations in the CoMP system. The CP also includes a controller. The controller is operative to select a multi-user precoding matrix for each base station, each precoding matrix comprising precoding weights to be applied to symbols to be transmitted to UEs by a base station; transmit to each base station, via the backhaul network interface, information about a precoding matrix selected for that base station; compute the information bits to be transmitted to all UEs in the CoMP system; and transmit the set of information bits to all base stations in the CoMP system, via the backhaul network interface.

Still another embodiment relates to a base station operative to provide communication services to UEs in a cell of a CoMP system. The base station includes a backhaul network interface operative to communicatively couple the base station to a CP of the CoMP system. The base station also includes a transmitter operative to transmit precoded symbols to UEs in the cell. The base station further includes a controller. The controller is operative to receive, from a CP via the backhaul network interface, information about a precoding matrix and the information bits to be transmitted to all UEs in the CoMP system; apply a modulation and coding scheme to the information bit to generate modulated symbols; apply precoding weights from the precoding matrix to the modulated symbols to generate precoded symbols; and transmit, via the transmitter, the precoded symbols to UEs in the cell.

DETAILED DESCRIPTION

Figure 1:
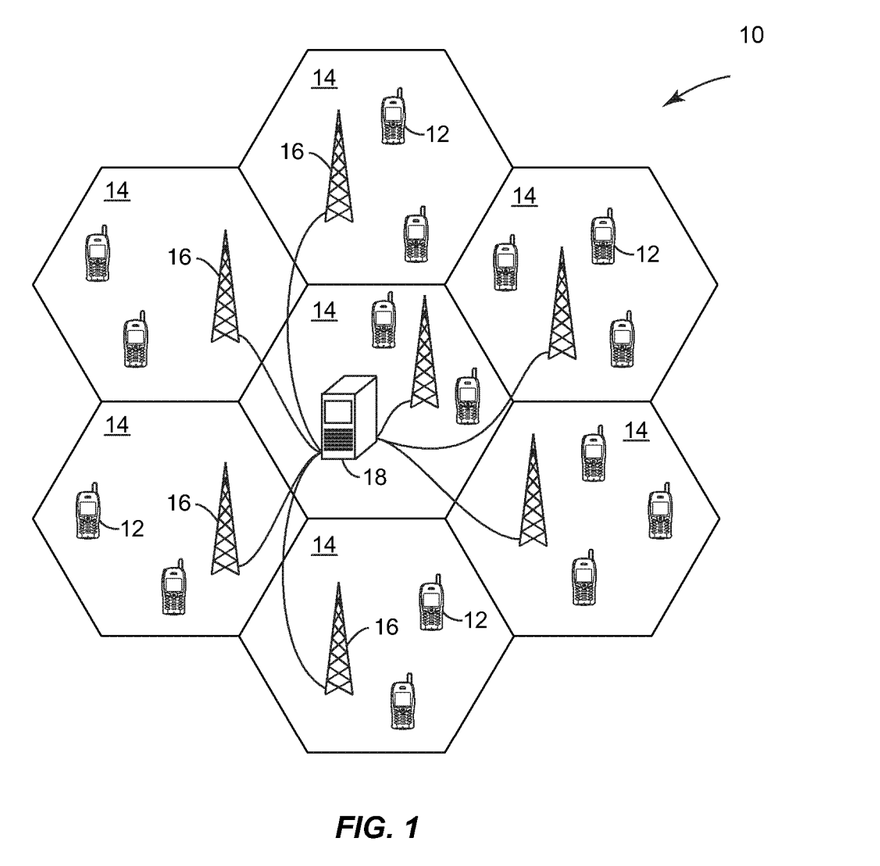
FIG. 1 is a functional block diagram of a Coordinated MultiPoint (CoMP) system.

FIG. 1 depicts a representative CoMP system 10 (also known as a CoMP cluster), in which User Equipment (UE) 12 receive wireless communication service in a number of cells 14. A base station 16 transmits downlink RF signals to UE 12 (and receives uplink transmissions from the UE 12) in each cell 14. To avoid inter-cell interference, a Central Processor (CP) 18 coordinates downlink transmissions to, and possibly also uplink transmissions from, UE 12 in the cells 14 forming the CoMP system 10. The CP 18 coordinates and optimizes transmissions to reduce or even avoid mutual interference among UE 12. To effectively accomplish this, the CP 18 must transmit voluminous data to each base station 16 (indeed, to each antenna chain of each base station 16) across a backhaul communication network. Capacity limitations of the backhaul network carrying such data may limit the ability of the CoMP system 10 to optimize performance.

According to embodiments of the present invention, backhaul communications between a CP 18 and base stations 16 in a CoMP system 10 are significantly reduced by distributing certain processing tasks from the CP 18 to the base stations 16, and by broadcasting some pre-coded signal information.

Consider a downlink CoMP transmission system 10 where N remote base stations 16 are used to transmit to K UEs 12 simultaneously on the same frequency and time. For each UE k∈{1, 2, . . . , K} and each base station i∈{1, 2, . . . , N}, let $H_{k,i}$ be the $n_{r,k}$ by $n_{t,i}$ channel response matrix for the link between base station i and UE k, where $n_{r,k}$ denotes the number of receive antennas at UE k and $n_{t,i}$ denotes the number of transmit antenna in the remote base station i. Also, let $H_k \equiv [H_{k,1}, H_{k,2}, \ldots, H_{k,N}]$ represents the channel response matrix for the link between all N base stations in the CoMP cell 10 to UE k. The CP 18 computes the multi-user precoding matrix $P_i$ (or matrix of precoding weights) for each remote base station i∈{1, 2, . . . , N}, where $P_i$ is a $n_{t,i}$ by $n_s \equiv \Sigma_{k=1}^{K} n_{s,k}$ matrix and $n_{s,k}$ denotes the number of data streams transmitted to UE k. Let $x_k$ denotes the $n_{s,k}$ by 1 symbol vector to be transmitted from the N remote base stations 16 to UE k, where the symbol vector $x_k$ is the output of the radio channel encoder from input information vector $b_k$. The signal received at UE k is given by $$r_k = H_k \begin{bmatrix} P_1 \\ P_2 \\ \vdots \\ P_N \end{bmatrix} x + n_k = \left( \sum_{i=1}^{N} H_{k,i} P_i \right) x + n_k \quad (1)$$

Each remote base station i transmits the complex-valued IQ symbols $s_i$, where $s_i = P_i \cdot x$ is a $n_{t,i}$ by 1 vector, and $$x = \begin{bmatrix} x_1 \\ x_2 \\ \vdots \\ x_K \end{bmatrix} \quad (2)$$

In prior art CoMP wireless communication systems 10, the CP 18 computes and applies the precoding weights $P_i$ to the symbol vectors x before transporting the IQ symbols to the remote base stations 16. The resulting IQ symbols constitute a $n_t \equiv \Sigma_{i=1}^{N} n_{t,i}$ dimensional vector $s = [s_1, s_2, \ldots, s_N]^T$ that needs to be quantized and transmitted for every symbol time period.

Figure 2:
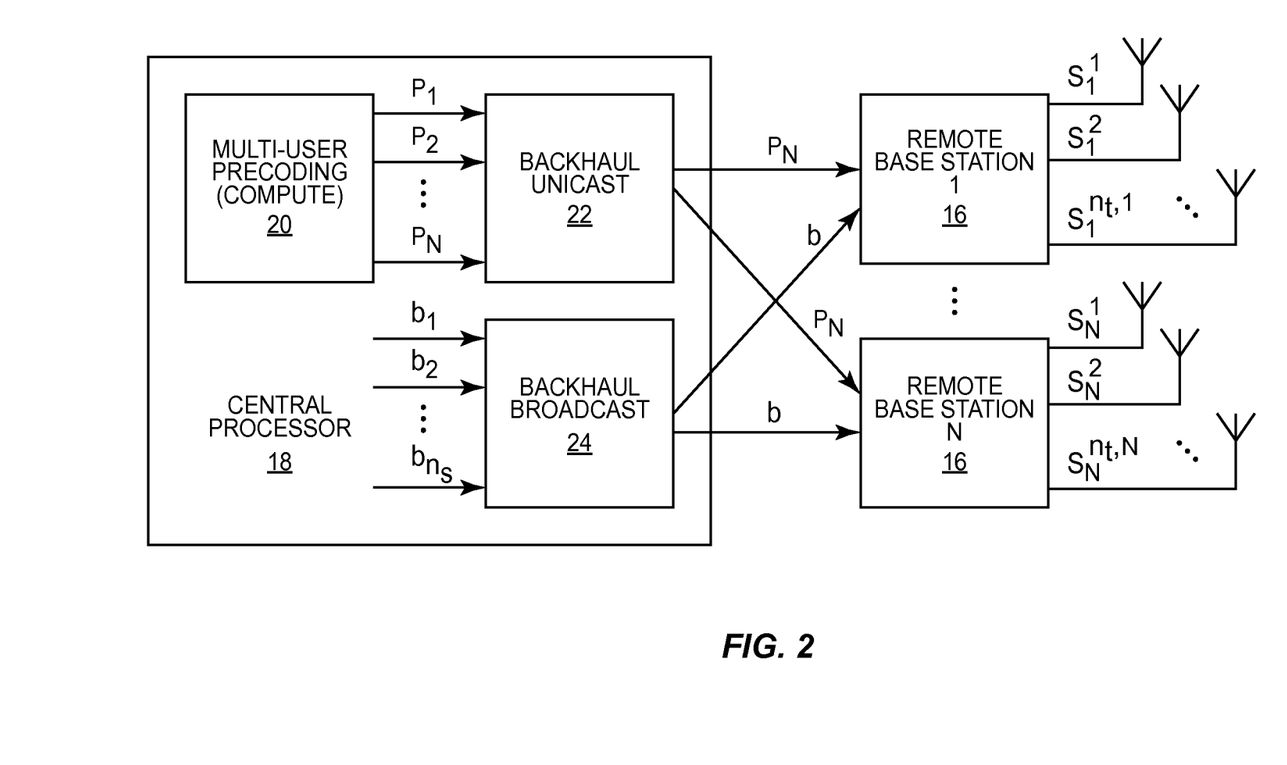
FIG. 2 is a functional block diagram of a Central Processor in the CoMP system of FIG. 1.
Figure 3:
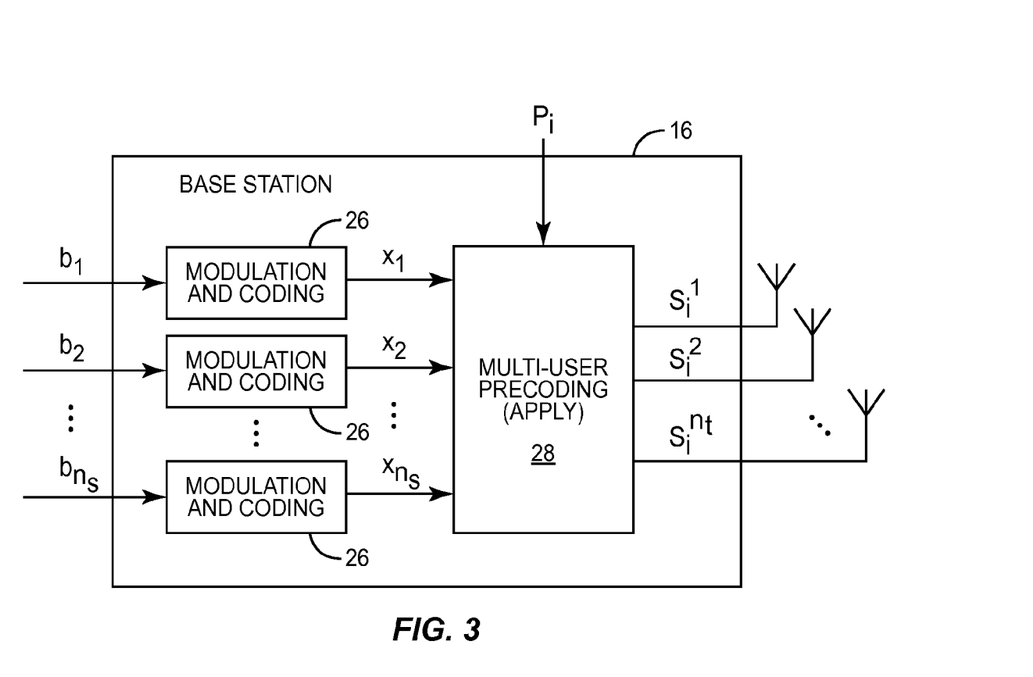
FIG. 3 is a functional block diagram of a base station in the CoMP system of FIG. 1.

According to embodiments of the present invention, the capacity burden of backhaul links is reduced by distributing part of the CP 18 encoding functions to the remote base stations 16. The encoder structure at the CP 18 and remote base station 16 are depicted in FIGS. 2 and 3, respectively. FIG. 2 further illustrates the information to be transported from the CP 18 to the remote base stations 16 over backhaul links.

The CP 18 includes a multi-user precoding block 20, backhaul unicast interface 22, and backhaul broadcast interface 24. The CP 18 first computes the multi-user precoding matrix $P_i$ for each remote base station i in the multi-user precoding block 20. In one embodiment, the multi-user precoding matrices can be computed based on, e.g., zero-forcing or MMSE linear precoding techniques. These are described in the papers by Spencer, et al., "Zero-Forcing Methods for Downlink Spatial Multiplexing in Multiuser MIMO Channels," published in the *IEEE Trans. Sig. Proc.*, vol. 52, pp. 461-471, Feb. 2004, and by Joham, et al., "Linear Transmit Processing in MIMO Communications Systems," published in the *IEEE Trans. Sig. Proc.*, vol. 53, no. 8, pp. 2700-2712, Aug. 2005, both of which are incorporated herein by reference in their entireties. In this case, the (quantized version of) precoding matrix weight $P_i$, the uncoded information symbol $b = [b_1, b_2, \ldots, b_{n_s}]^T$, and their corresponding modulation and coding schemes (MCS) are forwarded from the CP 18 to the remote base station 16 before the CoMP precoding, and possibly channel coding and modulation, take place (this transmission not shown in FIG. 2). In another embodiment, the multi-user precoding matrices can be selected from a predetermined codebook. In this case, the codebook index (or indices) corresponding to the selected precoding matrix weight $P_i$ and the uncoded information symbol b are forwarded from the CP 18 to the remote base station 16 (also not shown in FIG. 2).

The information symbol b in FIG. 2 is the collection of the information symbols (or bits, if coding and modulation are to be performed at the remote base stations 16) {$b_1$, $b_2$, . . . , $b_{n_s}$} from all the streams of all K UEs 12 in the system. Each information stream is a block of information bits to be processed into a block of modulation symbols by a channel encoder and symbol modulator. In the case of the Long Term Evolution (LTE) system, this mapping is determined by the selection of a Modulation and Coding Scheme (MCS) matching the channel condition.

FIG. 3 depicts a base station 16, including a processing block 26 for each transmit antenna, operative to apply modulation and coding to an information bitstream $b_n$, and a processing block 28 operative to apply the particular multi-user precoding matrix $P_i$ received from the CP 18. The corresponding modulated symbol streams are denoted by $\{x_1, x_2, \ldots, x_{n_s}\}$. The elements in each modulated symbol stream $x_n$ are then allocated to a certain region in the time-frequency plane. At the remote base stations 16, the precoding operation described above in equation (1) is applied element-wise (using the same notation as their block representation) to elements from all UEs 12 that are transmitted at the same time and frequency in the CoMP system 10. The precoding matrix $P_i$ usually remains constant over a large time-frequency region.

Embodiments of the present invention relieve the capacity burden on backhaul links. First, transporting non-precoded symbols instead of precoded symbols s does not require quantization of the symbols. This accounts for most of the savings in the backhaul capacity. In addition, allocating the channel coding function to the remote base stations 16 reduces the amount of information to be transported over backhaul links. Further reduction to the information transport can be obtained by applying lossless compression to the source bit streams $\{b_i\}$. The LTE system, for example, uses a rate 1/3 turbo channel code, and sending b instead of x can save another factor of three. The coefficients of the precoding matrix $P_i$ are quantized (for example, eight bits) but do not need to be updated for every symbol. As another example of additional backhaul capacity savings, a normal LTE downlink resource block consists of twelve subcarriers and seven symbols period. Exploiting frequency and time correlation in the system, the coefficients of the precoding matrix may be reused for multiple resource blocks. Furthermore, the precoding matrix can be selected from a finite set of precoders, obviating the need to communicate individual quantized entries in the precoder matrix.

Figure 4:
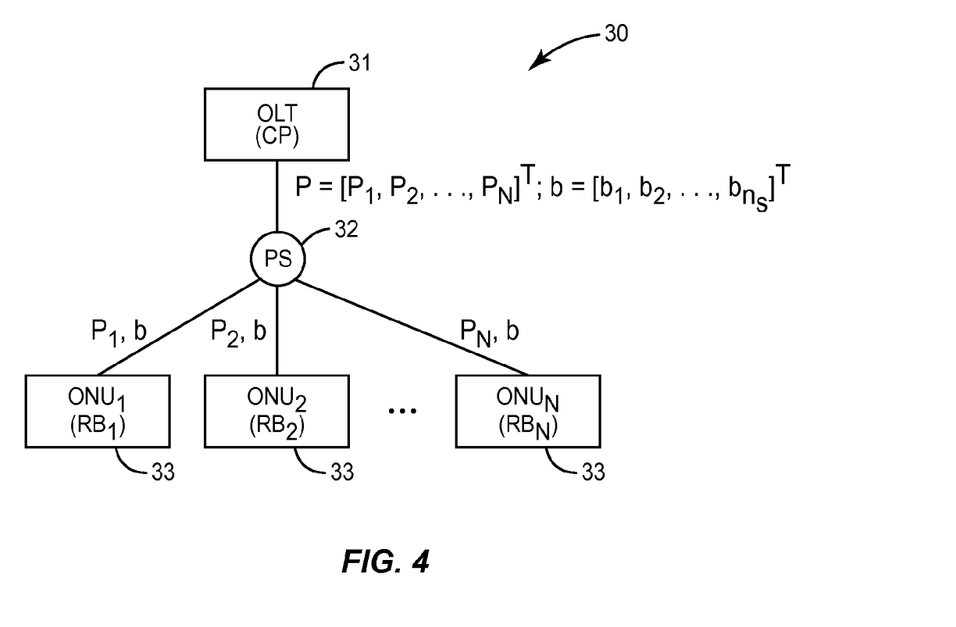
FIG. 4 is a functional block diagram of a backhaul communication network in the CoMP system of FIG. 1.

FIG. 4 depicts a Gigabit-capable Passive Optical Network (GPON) 30, which may, in some embodiments, be well suited for backhaul communications in a CoMP system 10 according to the present invention. The GPON comprises an Optical Line Terminal (OLT) 31, which may be an interface in the CoMP 18. The network 30 terminates at a plurality of Optical Network Units (ONU) 33, which may be interfaces in the base stations 16. The optical distribution network (ODN) connecting the OLT 31 and ONUs 33 is a passive, wavelength division multiplexed (WDM) optical network, which may include unpowered, Passive Splitters (PS) 32 as well as other network elements. FIG. 4 depicts the precoding matrices $P_i$ to be distributed to each base station 16, as well as the information bits b to be simultaneously distributed to all base stations 16 in the CoMP system 10. GPON 30 is a point-to-multi-point (P2MP) network architecture, and as such is well suited for the broadcast distribution of transmit information b to all remote base stations 16 simultaneously, which enables more efficient use of backhaul resources.

Figure 5:
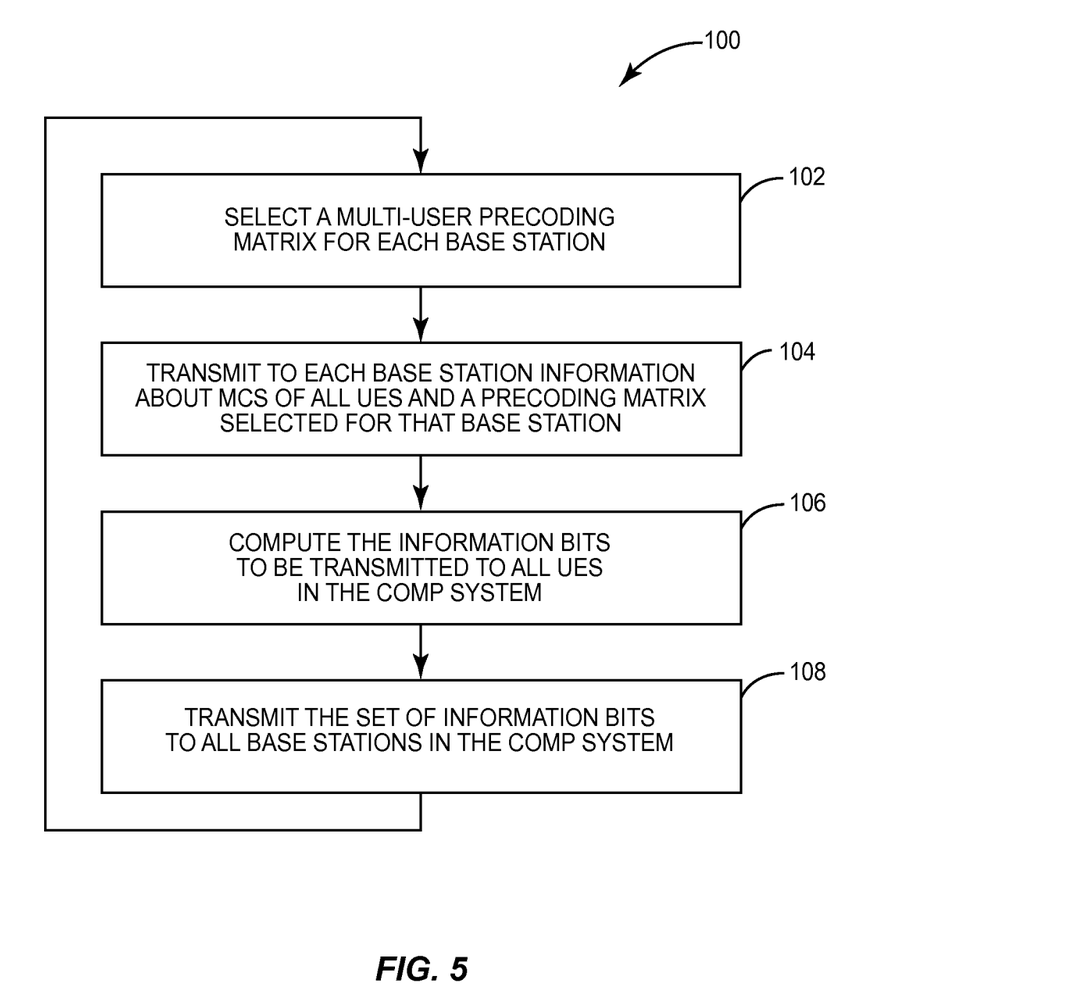
FIG. 5 is a flow diagram of a method of transmitting downlink signals from a Central Processor to a plurality of base stations in the CoMP system of FIG. 1.

FIG. 5 depicts a method 100 of distributing information that is to be transmitted to UEs 12 in a CoMP system 10, from a CP 18 to a plurality of base stations 16. The CP 18 selects a multi-user precoding matrix $P_i$ for each base station 16 (block 102). Each precoding matrix $P_i$ comprises precoding weights to be applied to symbols that are to be transmitted to UEs 12 in a cell 14 by the base station 16. The CP 18 also computes the modulation and coding scheme (MCS) to be applied to all UEs 12 in the CoMP system 10. The CP 18 transmits, to each base station 16, both the MCS information, and information about the precoding matrix $P_i$ selected for that base station 16 (block 104). The precoding matrix information may comprise the quantized precoding matrix $P_i$ itself. Alternatively, it may comprise an index into a codeword of predetermined (or previously communicated) precoding matrices. The CP 18 computes the information bits b to be transmitted to all UEs 12 in the CoMP system 10 (block 106), and transmits, such as by broadcast, the full set of information bits b to all base stations 16 in the CoMP system 10 (block 108). In one embodiment, the CP 18 may further losslessly compress the full set of information bits b prior to broadcasting to the base stations 16.

Figure 6:
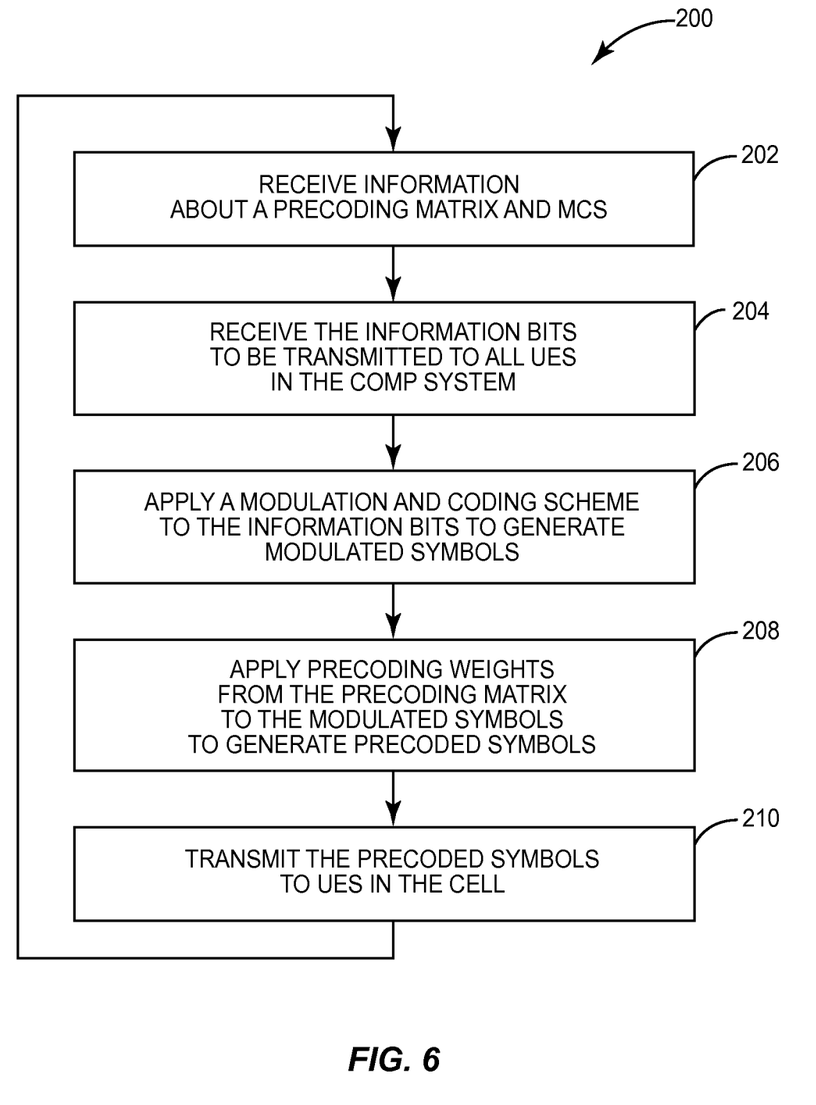
FIG. 6 is a flow diagram of a method of transmitting downlink signals from a base station to User Equipment in the CoMP system of FIG. 1.

FIG. 6 depicts a method 200 of transmitting signals to UE 12 in a cell 14 of a CoMP system 10 by a base station 16. The base station 16 receives, from the CP 18, MCS information for all UEs 12, and information about a precoding matrix $P_i$ (block 202) for the particular base station 16. The precoding matrix information may comprise the quantized precoding matrix $P_i$ itself. Alternatively, it may comprise an index into a codeword of predetermined (or previously communicated) precoding matrices (the step of indexing the codeword with the received precoding matrix information is not shown in FIG. 6). The base station 16 also receives, from the CP 18, the information bits b to be transmitted to all UEs 12 in the CoMP system 10 (block 204). In one embodiment, the information bits b are received in a compressed format, and the base station 16 decompresses them (not shown in FIG. 6). The base station 16 applies a modulation and coding scheme (MCS) to the information bits b to generate modulated symbols x (block 206). The base station 16 may periodically receive an indication from the CP 18 as to which MCS to apply. The base station 16 then applies precoding weights from the precoding matrix $P_i$ to the modulated symbols x, to generate precoded symbols s (block 208). The base station 16 then transmits the precoded symbols s to UEs 12 in the cell 14 (and possibly also into neighboring cells).

Figure 7:
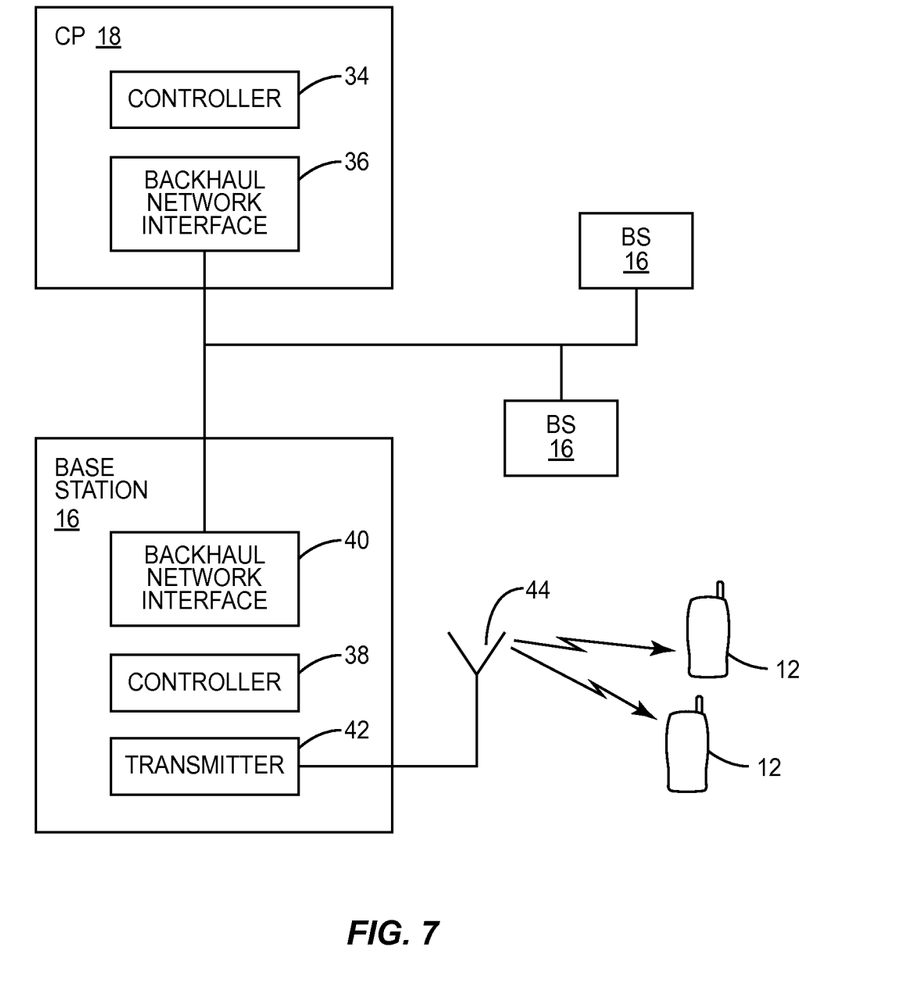
FIG. 7 is a functional block diagram of a Central Processor and a base station in the CoMP system of FIG. 1.

FIG. 7 depicts a representative implementation of a CP 18 and base station 16 in a CoMP system 10 according embodiments of the present invention. The CP 18 includes one or more controllers 34 and a backhaul network interface 36. The controller 34 may comprise a processor or Digital Signal Processor (DSP) together with appropriate software, programmable logic together with appropriate firmware, a state machine, or the like. The controller 34 is operative to implement the functionality of the multi-user precoding block 20, backhaul unicast interface 22, and backhaul broadcast interface 24 as described with reference to FIG. 2, as well as other CoMP functionality, for example by executing program code stored on computer readable media. The backhaul network interface 36 may comprise any network interface operative to communicatively connect the CP 18 with a plurality of base stations 16, such as an interface to a wired or wireless Local Area Network (e.g., Ethernet, FDDI, Wi-Fi, and the like) or Metropolitan Area Network (e.g., ATM, WiMax, and the like). In one embodiment, the backhaul network interface 36 is an OLN 31 of a GPON 30, as described with reference to FIG. 4. The CP 18 may include additional circuits, features, and functionality not depicted in FIG. 7 for clarity.

The base station 16 includes one or more controllers 38, a backhaul network interface 36, and one or more transmitters 42. The controller 38 may comprise a processor, DSP, or the like, together with appropriate software and/or firmware, as described above. The controller 38 is operate to implement at least the functionality of the modulation and coding blocks 26 and the application of multi-user precoding 28, as depicted in FIG. 3, for example by executing program code stored on a computer readable media. The backhaul network interface 36 may comprise any network interface operative to communicatively connect the base station 16 with a CP 18, as described above. In one embodiment, the backhaul network interface 36 is an ONU 33 of a GPON 30, as described with reference to FIG. 4. The transmitter 42 is operative to transmit precoded symbols s to UEs 12 in the cell 14, according to a wireless communication air interface protocol, via an antenna 44. The base station may include multiple transmitters 42—or the transmitter 42 may include multiple branches—for transmitting signals to UEs 12 on multiple antennas 44. The base station 16 may include additional circuits, features, and functionality—such as one or more receiver chains for uplink communications—not depicted in FIG. 7 for clarity.

Embodiments of the present invention provide an effective means to transport backhaul signal from a CP 18 to multiple remote base stations 16 in a CoMP system 10. The inventive method exploits the underlying signal structure, and allocates part of the CP 18 encoding functions to the remote base stations 16, to reduce the volume of backhaul signals. In addition, according to one embodiment, a novel broadcast and unicast backhaul architecture for efficient CoMP system 10 support is presented. The inventive method allows the backhaul network to broadcast an information part of the backhaul signals to multiple base stations 16 simultaneously, to further reduce the burden on the capacity of backhaul link.

As used herein, the terms "broadcast" and "broadcasting," and the like, refer to the temporally simultaneous communication of information from a single entity to two or more entities. The term is to be construed broadly, and includes, for example, broadcast via guided or unguided media, and by directional or omnidirectional transmission.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of transmitting signals to user equipment (UE) in a cell of a Coordinated Multipoint (CoMP) wireless communication system, comprising the steps of:
   receiving, from a Central Processor (CP), information about a precoding matrix and the information bits to be transmitted to all UEs in the CoMP system;
   applying a modulation and coding scheme (MCS) to the information bit to generate modulated symbols;
   applying precoding weights from the precoding matrix to the modulated symbols to generate precoded symbols; and
   transmitting the precoded symbols to UEs in the cell.

2. The method of claim 1 wherein the step of receiving, from the CP, information about the precoding matrix comprises receiving, from the CP, an index into a precoding matrix codebook; and further comprising using the received index to retrieve the precoding matrix from the precoding matrix codebook.

3. The method of claim 1 wherein the step of receiving, from the CP, information about the precoding matrix comprises receiving, from the CP, the precoding matrix computed at the CP.

4. The method of claim 1 further comprising the step of receiving, from the CP, the MCS to apply to the information bits.

5. The method of claim 1 wherein the step of receiving, from the CP, the information bits to be transmitted to all UEs in the CoMP system comprises receiving compressed information bits, and further comprising decompressing the compressed information bits prior to applying the MCS.

6. A base station operative to provide communication services to user equipment (UE) in a cell of a Coordinated Multipoint (CoMP) wireless communication system, comprising:
   a backhaul network interface operative to communicatively couple the base station to a Central Processor (CP) of the CoMP system;
   a transmitter operative to transmit precoded symbols to UEs in the cell; and
   a controller operative to
   receive, from the CP via the backhaul network interface, information about a precoding matrix and the information bits to be transmitted to all UEs in the CoMP system;
   apply a modulation and coding scheme (MCS) to the information bit to generate modulated symbols;
   apply precoding weights from the precoding matrix to the modulated symbols to generate precoded symbols; and
   transmit, via the transmitter, the precoded symbols to UEs in the cell.

7. The base station of claim 6 wherein the controller is operative to receive, from the CP via the backhaul network interface, information about the precoding matrix by receiving, from the CP via the backhaul network interface, an index into a precoding matrix codebook; and wherein the controller is further operative to use the received index to retrieve the precoding matrix from the precoding matrix codebook.

8. The base station of claim 6 wherein the controller is operative to receive, from the CP via the backhaul network interface, information about the precoding matrix by receiving, from the CP via the backhaul network interface, the precoding matrix computed at the CP.

9. The base station of claim 6 wherein the controller is further operative to receive, from the CP via the backhaul network interface, the MCS to apply to the information bits.

10. The base station of claim 6 wherein the controller is operative to receive, from the CP via the backhaul network interface, the information bits to be transmitted to all UEs in the CoMP system by receiving compressed information bits, and further wherein the controller is further operative to decompress the compressed information bits prior to applying the MCS.

* * * * *

UNITED STATES PATENT AND TRADEMARK OFFICE
CERTIFICATE OF CORRECTION

PATENT NO. : 9,571,259 B2
APPLICATION NO. : 14/249740
DATED : February 14, 2017
INVENTOR(S) : Hui et al.

It is certified that error appears in the above-identified patent and that said Letters Patent is hereby corrected as shown below:

On the Title Page

In Item (56), under "U.S. PATENT DOCUMENTS", in Column 2, Line 2,
delete "Kim" and insert -- Kim et al. --, therefor.

On Page 2, in Item (56), under "U.S. PATENT DOCUMENTS", in Column 1, Line 1,
delete "Walton" and insert -- Walton et al. --, therefor.

On Page 2, in Item (56), under "U.S. PATENT DOCUMENTS", in Column 1, Line 3,
delete "Waes" and insert -- Waes et al. --, therefor.

On Page 2, in Item (56), under "OTHER PUBLICATIONS", in Column 2, Line 3,
delete "pp. 2704-2707." and insert -- pp. 2700-2712. --, therefor.

On Page 2, in Item (56), under "OTHER PUBLICATIONS", in Column 2,
Lines 4-7, delete "Haard T. et al: Zero-Forcing Methods for Downlink Spatial
Multiplexing in Multiuser MIMO Channel IEEE Service Center, New York, NY, US, vol.
52, No. 2, Feb. 1, 2004 (Feb. 1, 2004), pp. 461-468." and
insert -- Haardt et al: Zero-Forcing Methods for Downlink Spatial Multiplexing in
Multiuser MIMO Channels, IEEE Transactions on Signal Processing, vol. 52, No. 2, Feb.
1, 2004 (Feb. 1, 2004), pp. 461-471. --, therefor.

In the Specification

In Column 1, Line 10, delete "13/045,803 filed on Mar. 11, 2011," and
insert -- 13/045,830 filed on Mar. 11, 2011, now Pat. No. 8,737,298, --, therefor.

In Column 5, Line 38, delete "CoMP 18." and insert -- CoMP 10. --, therefor.

Signed and Sealed this
Twentieth Day of June, 2017

Joseph Matal
*Performing the Functions and Duties of the
Under Secretary of Commerce for Intellectual Property and
Director of the United States Patent and Trademark Office*

In Column 6, Line 51, delete "OLN 31" and insert -- OLT 31 --, therefor.

In Column 6, Line 56, delete "interface 36," and insert -- interface 40, --, therefor.

In the Claims

In Column 8, Line 21, in Claim 6, delete "operative to" and insert -- operative to: --, therefor.